(12) United States Patent
Chen et al.

(10) Patent No.: US 8,599,449 B2
(45) Date of Patent: Dec. 3, 2013

(54) TECHNICAL DOCUMENTS CAPTURING AND PATENTS ANALYSIS SYSTEM AND METHOD

(71) Applicant: Industrial Technology Research Institute, Hsinchu (TW)

(72) Inventors: Chen-Kun Chen, Changhua Hsien (TW); Yu-Chen Yu, Taoyuan Hsien (TW); Mu-Tao Chu, Hsinchu (TW); Kuan-Chieh Tu, Taiepi (TW); Chao-Chin Chang, Taichung Hsien (TW); Hsiao-Wen Chang, Taipei (TW); Chen-Peng Hsu, Kaohsiung (TW)

(73) Assignees: Industrial Technology Research Institute, Hsinchu (TW); Chao-Chin Chang, Taichung Hsien (TW)

( * ) Notice: Subject to any disclaimer, the term of this patent is extended or adjusted under 35 U.S.C. 154(b) by 0 days.

(21) Appl. No.: 13/734,999

(22) Filed: Jan. 6, 2013

(65) Prior Publication Data

US 2013/0120809 A1    May 16, 2013

Related U.S. Application Data

(62) Division of application No. 12/346,775, filed on Dec. 30, 2008, now Pat. No. 8,373,880.

(30) Foreign Application Priority Data

Mar. 26, 2008   (CN) .......................... 2008 1 0088406

(51) Int. Cl.
*H04N 1/04* (2006.01)
*G06F 3/12* (2006.01)
*G06F 15/00* (2006.01)
*G06K 1/00* (2006.01)

(52) U.S. Cl.
USPC .......................................... 358/488; 358/1.13

(58) Field of Classification Search
None
See application file for complete search history.

(56) References Cited

U.S. PATENT DOCUMENTS

| 6,947,953 B2 | 9/2005 | Herzenberg et al. |
| 2007/0208669 A1 | 9/2007 | Rivette et al. |

FOREIGN PATENT DOCUMENTS

| TW | 567432 | 12/2003 |
| TW | 200712944 | 4/2007 |
| WO | 2004/015617 A1 | 2/2004 |

OTHER PUBLICATIONS

Taiwan Patent Office, Office Action, Patent Application No. TW098107461, Mar. 27, 2013, Taiwan.

*Primary Examiner* — Douglas Tran

(57) ABSTRACT

Disclosed is a system and method for capturing technical documents and reading and commentating captured documents thereof. The system may comprise a capturing system and a reading with commentating system. The capturing system selects related drawings from a group of technical documents. It then provides important information and the related drawings onto an image for the readers' review. The reading with commentating system allows the readers to process technical classification, management and export/import for the group of technical documents. Readers may make comments on an information sharing platform after reviewing the technical documents. Besides, other materials collected or generated from the technical analysis on the technical documents may be attached to the information sharing platform.

22 Claims, 17 Drawing Sheets

|   | PAT. NO. |   | Title |
|---|---|---|---|
| 1 | 7,330,513 | T | Apparatus of transmitter and receiver for MIMO MC-CDMA system |
| 2 | 7,330,446 | T | Closed-loop power control method for a code-division multiple-access cellular system |
| 3 | 7,329,563 | T | Method for fabrication of wafer level package incorporating dual compliant layers |
| 4 | 7,329,368 | T | Temperature compensating chiral dopants |
| 5 | 7,329,364 | T | Method for manufacturing bonded wafer with ultra-thin single crystal ferroelectric film |
| 6 | 7,327,327 | T | Omnidirectional broadband monopole antenna |
| 7 | 7,325,960 | T | Structure of bar-like side-emitting light guide and planar light source module |
| 8 | 7,323,218 | T | Synthesis of composite nanofibers for applications in lithium batteries |
| 9 | 7,322,869 | T | Structure of a coplanar gate-cathode of a triode CNT-FED and method of manufacturing same |
| 10 | 7,321,629 | T | Method and apparatus for protecting and transmitting the side information related to peak-to-average power ratio reduction in a multicarrier system |
| 11 | 7,321,610 | T | Method and system of interference cancellation in multi-cell CDMA systems |
| 12 | 7,321,550 | T | Method of equalization in an OFDM system |
| 13 | 7,320,776 | T | Fluid analytical devices |
| 14 | 7,319,686 | T | Frame synchronization in multi-cell systems with a data interface |
| 15 | 7,319,625 | T | Built-in memory current test circuit |

FIG. 2 ( Prior Art )

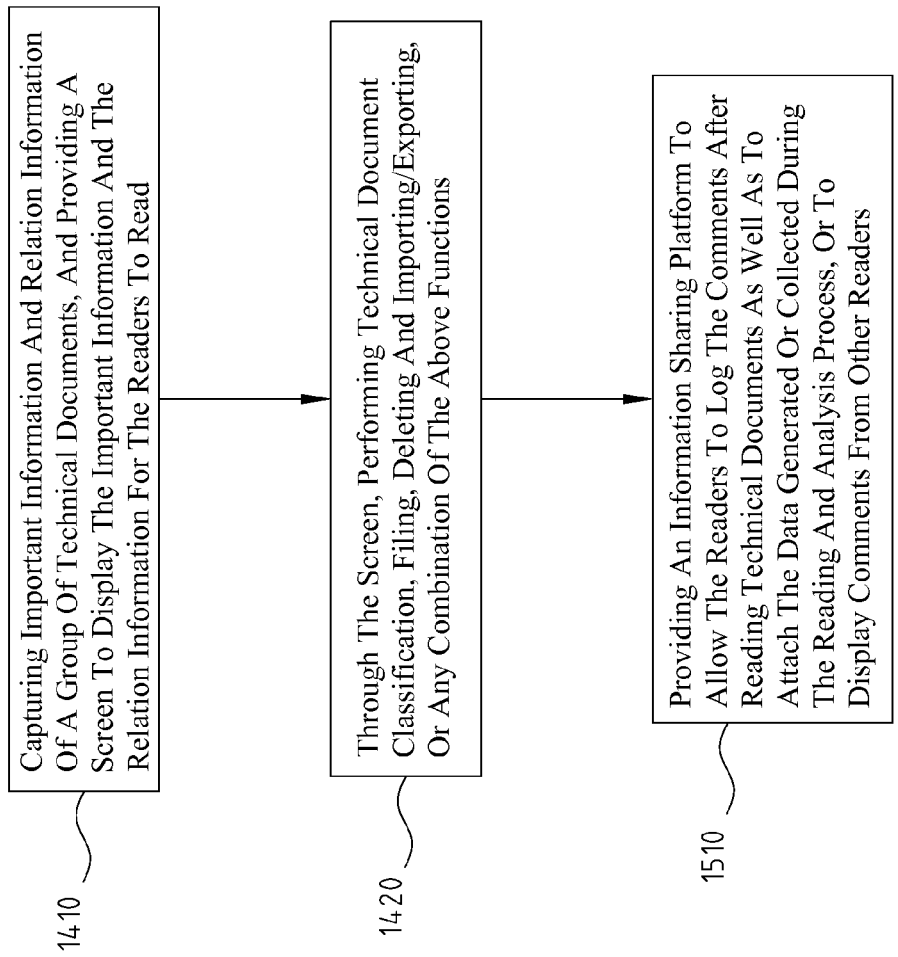

TECHNICAL DOCUMENTS CAPTURING AND PATENTS ANALYSIS SYSTEM AND METHOD

CROSS-REFERENCES TO RELATED APPLICATIONS

This is a division of U.S. patent application Ser. No. 12/346,775, filed Dec. 30, 2008, which is incorporated herewith by reference in its entirety.

FIELD OF THE INVENTION

The present invention generally relates to a system and method for capturing technical documents and commentating captured documents thereof.

BACKGROUND OF THE INVENTION

U.S. Pat. No. 6,058,417 disclosed a method and apparatus for information presentation and management in an online trading environment where the images can be harvested from a plurality of sites based upon user-supplied information, including descriptions of items for sale and locations from which images that are to be associated with the items can be retrieved. Then, thumbnail images are created corresponding to the harvested images and aggregated onto a web page for presentation at a remote site. Similarly, upon a query from a user, thumbnail images corresponding to items that satisfy the user query are displayed, each of the thumbnail images previously having been created based upon a user-specified image. While the above patent disclosed an interface with arranged thumbnail images for online trading environment, the above patent does not disclose the application of the disclosed technique to the technical document analysis and to the reading management interface. Hence, the above patent does not disclose the technique of capturing the diagrams or images contained in technical documents.

U.S. Pat. No. 5,963,966 disclosed an automated capture of technical documents for electronic review and distribution, by using OCR to dissect the technical documents into drawing files and text files, and filing to appropriate locations for storage or display. However, the use of OCR to scan the entire technical document will consume a large amount of system resource and has a low yield rate.

The research and development team usually performs a lot of documents searching and reading in the initial stage of technical development. For example, Taiwan Patent Publication No. 200417882 disclosed a method for generating patent analysis data, by looking up in an external database to capture a plurality of patents or classification numbers, and then performing patent analysis and relevance linkage according to the patents, classification numbers, and feature information.

FIG. 1 shows an exemplary flowchart of Taiwan Patent No. 567432 of a system and method for mining and statistical analyzing patent information. As shown in FIG. 1, the user selects analysis type and sets the analysis conditions via a client interface. The analysis conditions are translated by an application software server into inquiry conditions of specific format. The inquiry conditions are used to search the database, and the search result is transmitted by the application software server to the client computer to display the analysis result.

In the patent information analysis, usually as shown in FIG. 2, the list mode is used to display the related information of the technical documents, such as document, title, document number, application date, publication date, published date, issue date of patent, author/inventor, assignee, and so on. If a reader wants to obtain further information, the reader must enter the subject to read the abstract or even entire document of text and drawings to know whether the document is of interest and relevance. This takes much time and more system resource for data reading and processing, thus becomes a major performance bottleneck for the research team.

Therefore, it remains an important issue as to how to save system resource and effectively integrate the documents in a plurality of technical databases and effectively analyze the contents and the trends of technical documents.

The aforementioned techniques only disclose the capturing of the data from the external database to the local database or server for analysis, but neither disclose the use of the relevance operation of documents of the external database nor provide the reader with an image of fast information digestion or required interactive commentating platform to share comments and reviews to improve the technical data reading efficiency.

SUMMARY OF THE INVENTION

The exemplary disclosed embodiments according to the present invention may provide a management system and method on technical documents, which may perform classification, capturing, reading, commenting and sharing information, and exchanging comments. The disclosed embodiments sift related drawings from a group of technical documents through preprocessing, and integrate the captured important information onto a screen, so that the readers may review the documents and information through a graphic screen, instead of repeatedly operating resource-consuming Graphic Format Files, such as PDF or TIFF. The disclosed embodiments may further allow the readers to process technical classification, management and export/import for the group of technical documents. Readers may comment on an information sharing platform after reviewing the technical documents.

In an exemplary embodiment, the disclosed is directed to a system for capturing technical documents. The capturing system comprises: a verify sift unit, a capture and select module, and a data capturing module. The verify sift unit uses the relation of technical documents as a judge basis to configure the capturing parameters of the technical documents. The capture and select module captures the relation information from technical documents through the capturing parameters configured by the verify sift unit. The data capturing module selects important information, and displays the important information together with the relation information captured by the capture and select module onto a screen for the readers.

In another exemplary embodiment, the disclosed is directed to a system for reading technical documents. The reading system at least comprises: a graphical screen, a classification module, a management module, and an import/export module. Through the graphical screen, the classification module allows readers to classify a group of graphical technical documents into different technical classes or product classes and store in a system. The management module allows readers to file, after finishing identifying the technical data, into the system according to features of the technical data, or delete the selected technical data from the system. The import/export module allows readers to import and export the selected technical data from or to the system.

The reading system may further include a hyperlink module to link with the databases in the system, and obtains the corresponding documents/materials in the databases.

In another exemplary embodiment, the disclosed is directed to a system for commenting technical documents. The commentating system at least comprises: a comment subject unit, a reading comment unit and an attachment unit. The comment subject unit allows readers to input the comment subject as well as display different comment subjects in the system. The reading comment unit allows the readers to log the comments after reading as well as displaying comments from other readers. The attachment unit allows the readers to attach the data collected or generated by the readers during reading and analysis.

In another exemplary embodiment, the disclosed is directed to a method for capturing technical documents. The capturing method comprises: using the relation of technical documents as a judge basis to configure the capturing parameters of the technical document; selecting the relation information from the technical documents according to the configured capturing parameters; and capturing the selected relation information and displaying the relevant information and the selected relation information on a screen.

In another exemplary embodiment, the disclosed is directed to a method for reading technical documents. The reading method comprises: capturing important information and relevance information of a group of technical documents and providing a screen to display the important information and relation information for the readers to read; and performing functions of technical document classification, filing, deleting and importing/exporting or any combination of the above functions through the screen.

In another exemplary embodiment, the disclosed is directed to a method for reading and commentating technical documents. The reading and commentating method comprises: the aforementioned exemplary reading method, in which a step of providing an information sharing platform is further included. The information sharing platform allows the readers to log the comments after reading technical documents as well as to attach the data generated or collected during the reading and analysis process, or even to display comments from other readers.

In the aforementioned exemplary embodiments, the capturing system and the reading system for technical documents may integrate as a capturing and reading system for technical documents. The reading system and the commentating system for technical documents may also integrate as a reading and commentating system for technical documents. Or, the capturing system, the reading system and the commentating system for technical documents may integrate as a capturing, reading and commentating system for technical documents.

When applied to the analysis for design patents, the present invention may depict powerful results. For example, by displaying main figures from a plurality of patent documents of a group, the present invention enables the user to accelerate the patent map sifting at the initial search stage so as to reduce the user's demands on resource-consuming graphic format files and improve the system resource utilization.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 2 shows a list mode being used to display the related information of the technical documents in a conventional patent document analysis exemplar.

FIG. 15 is an exemplary flowchart illustrating a reading and commenting method for technical documents, consistent with certain disclosed embodiments of the present invention.

DETAILED DESCRIPTION OF THE PREFERRED EMBODIMENTS

The exemplary disclosed embodiments of the present invention may utilize a plurality of databases, such as databases for technical documents, analyze a group of original technical documents, and reorganize as a data group with relation correspondence to establish the internal databases. After the relation information of the group of technical documents, such as patent documents or research papers, is captured, the disclosed embodiments may provide the captured relation information to the readers with a graphical screen for reading the technical documents as well as other processing tasks, such as, classifying, filing, deleting, importing/exporting, and so on. In addition, the disclosed embodiments may allow the user to record the comments after viewing the technical documents or shows the comments from other readers. The disclosed embodiments may also attach or generate other data collected or generated during the reading and analysis. Therefore, the user at the client end may analyze the contents and the trend of the technical documents effectively and rapidly under minimized system resource.

Figure 1:
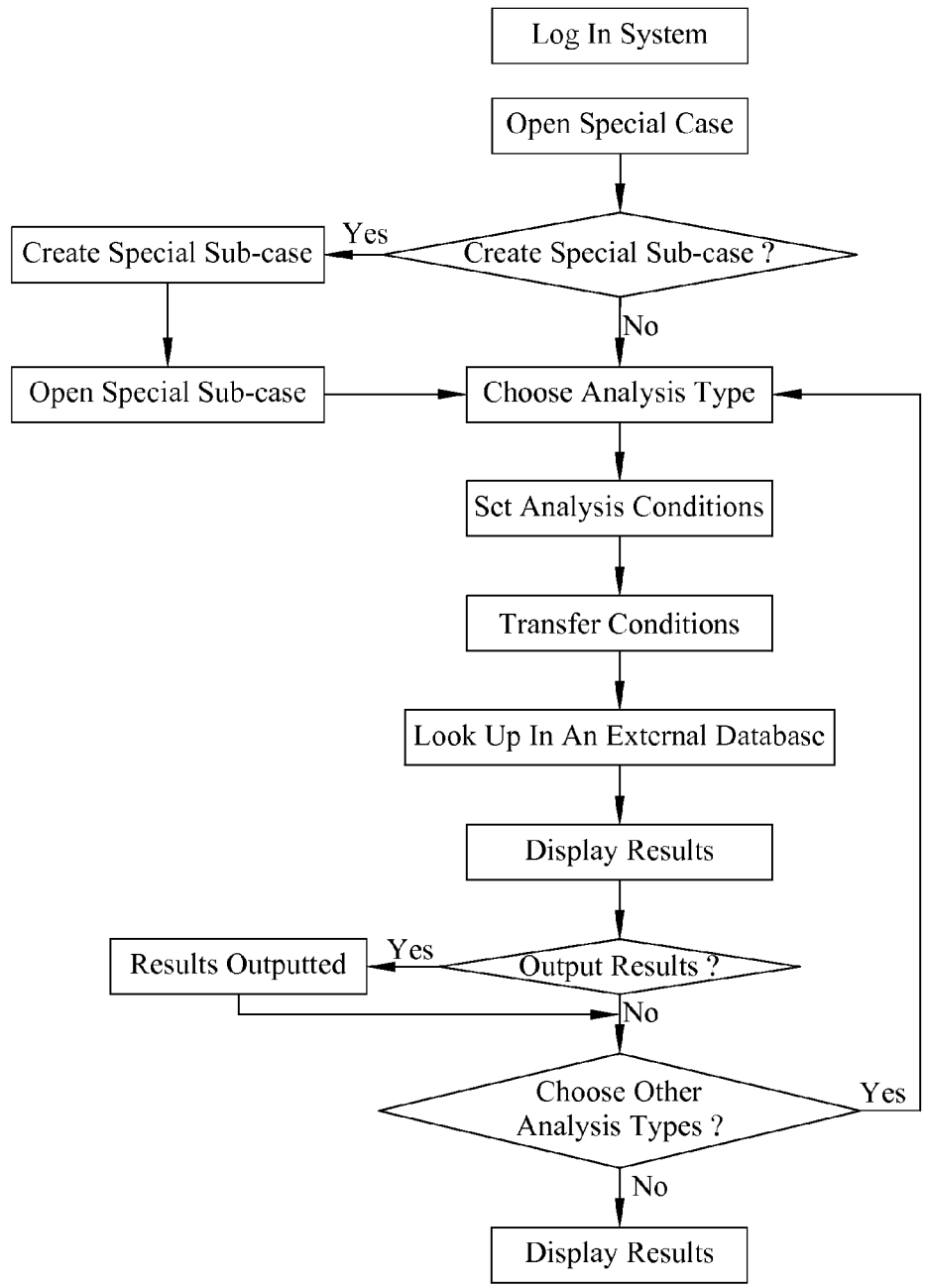
FIG. 1 is an exemplary flowchart illustrating the operation of a method for generating patent analysis data.
Figure 3A:
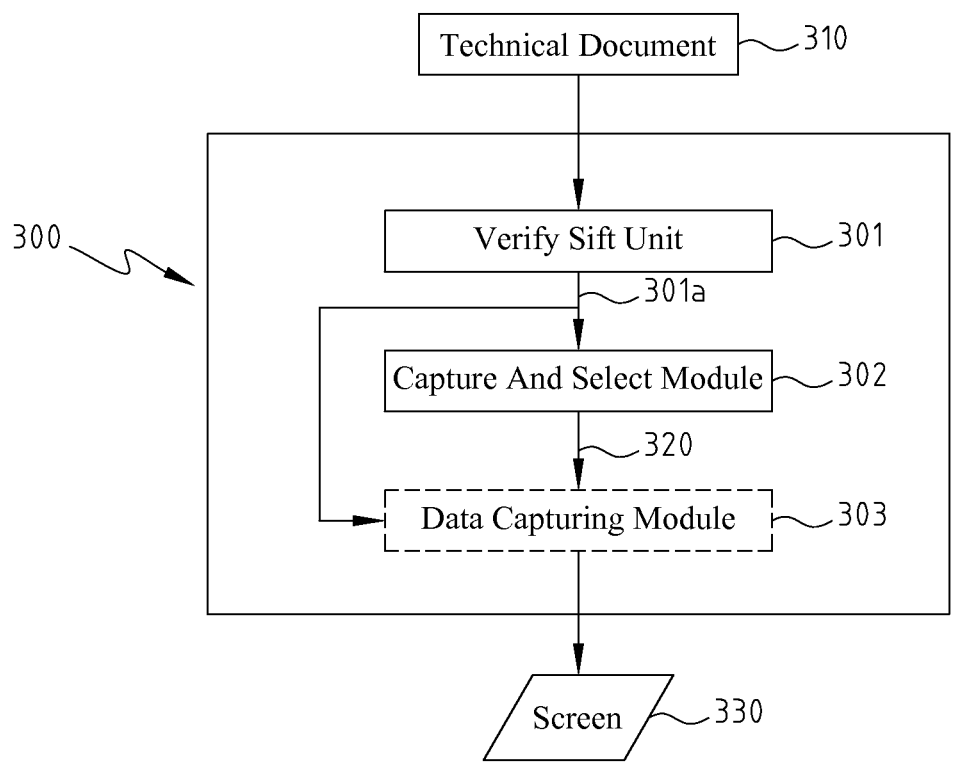
FIG. 3A is an exemplary capturing system for technical documents, consistent with certain disclosed embodiments of the present invention.

FIG. 3A shows an exemplary capturing system for technical documents, consistent with certain disclosed embodiments of the present invention. As shown in FIG. 3A, a capturing system 300 captures relation information 320 from a technical document 310, such as patent document or research paper. Captured relation information 320 may include image or text. Capturing system 300 may provide a graphical screen, usually arranged as lists or tables for the reader to read the relation information. Relation information 320 is the result generated by performing at least a relation operation and analysis on at least an internal database or technical document.

Relation refers to the correspondent relationship among technical documents or data in the database, including text and drawings. For example, relation may be the correspondent relationship between the application number and the application date, or the correspondent relationship between the journal title and the inventor.

Relation operation refers to the operations, comparison or sifting, such as Boolean logic, weighting, etc., on the technical document or data in the database. Taking patent documents as an example, the sifting on the data with high relation operation may include the selection of patent number, application date, inventor, assignee information of the same patent. The sifting on the data with low relation operation may include the selection of inventor information based on the patent number or inventor information of other patent numbers.

In the exemplary capturing system 300 of FIG. 3A, the capturing system 300 comprises a verify sift unit 301, and a capture and select module 302. Verify sift unit 301 uses the relation information of technical document 310 as a judge basis to configure the capturing parameters of technical document 310. Capture and select module 302 captures the relation information 320 from technical document 310 through capturing parameters 301a configured by verify sift unit 301. For example, relation information 320 may be the related drawings of the technical document 310. Each related drawing is the main figure of a technical document, such as the first-page figure or the characteristic figure of the technical document.

Figure 3B:
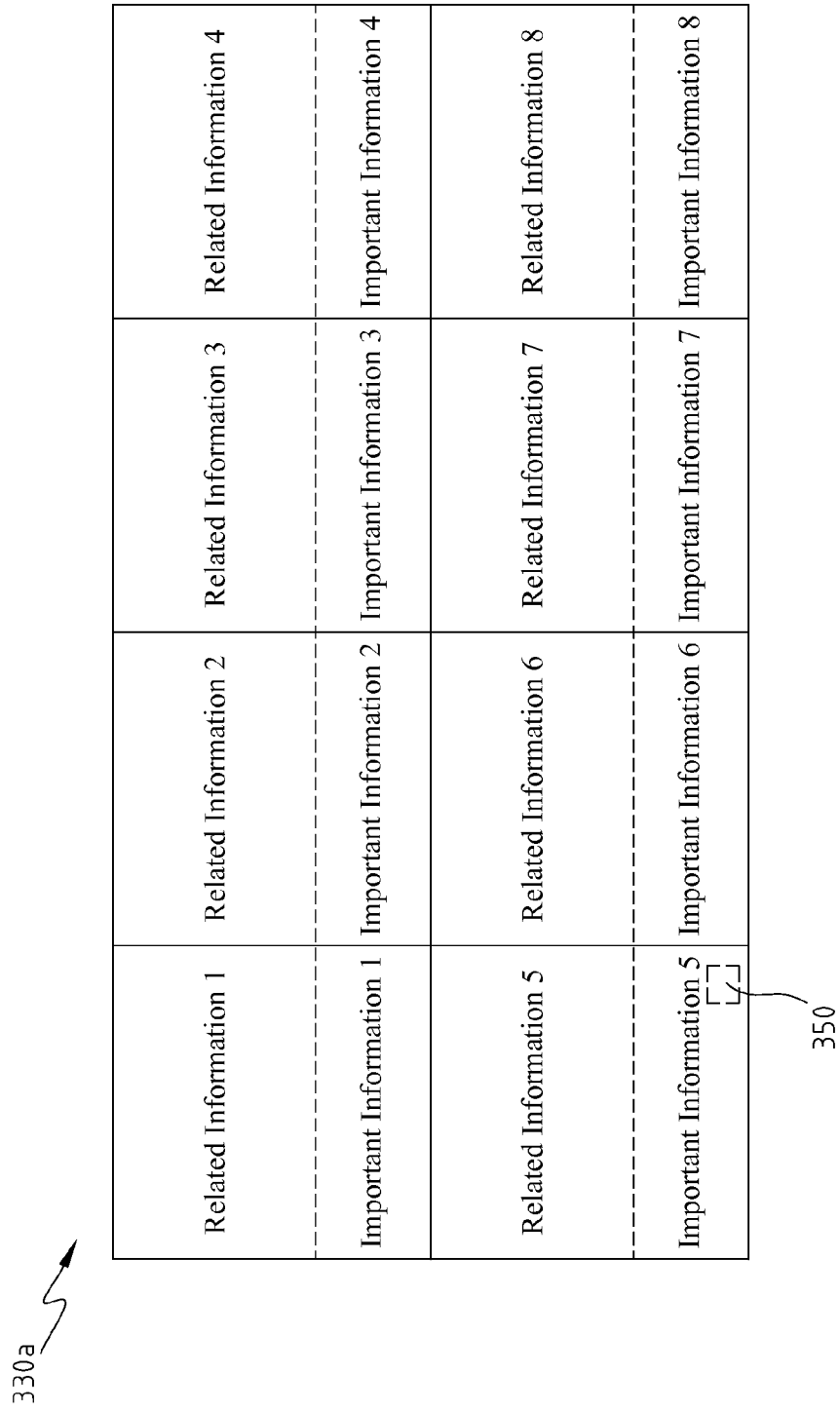
FIG. 3B is an exemplary graphic screen, consistent with certain disclosed embodiments of the present invention.

Capturing system 300 may further include a data capturing module 303 to select important information, such as title of the patent document, assignee, inventor, document number or specific labels, and provide a screen 330 together with relation information 320 captured by capture and select module 302 to the readers. FIG. 3B shows an exemplary screen 330a of screen 330.

Screen 330a shows 8 pieces of relation information and their corresponding important information. If the 8 pieces of relation information are the main figures in the first page of 8 U.S. patents, their corresponding important information may be the patent title and/or the U.S. patent number and/or assignee. Graphical screen 330a may also arrange the related information and corresponding important information in a regular manner, such as a table or list, or in a continuous webpage form so that the reader may scroll up and down to read, or even alternatively, in a discontinuous webpage form so that the reader may read page by page. The graphical screen (or at least one document unit) may also provide hyperlinks, may be shown as mark 350 or the whole region of the document unit, to link the system database for obtaining advanced related information, such as full text of the patent.

Furthermore, when the cursor hovers to the related information, a popup window will display the abstract, title, author (inventor), owner (assignee), publication (issue) date or its any combination of the technical document corresponding to the related information.

The related information and/or corresponding important information of any block may be defined as a document unit. The related information contained in the document unit may be the main figures in the first page or the characteristic figure of a patent, and the corresponding important information may be title, document (patent) number, author (inventor), owner (assignee), application serial number, date (of filing, publication, or issue), abstract, and/or any combination of the above. The document units are arranged in an m×n manner, where both m and n are integers greater than 1. The preferred embodiment of m is 3-7, while the preferred embodiment of n is 3-1000. For better visual sensation, the preferred value of n is between 8 and 30.

For example, for a web page to display 100 patent documents, the layout of the web page may be 4×25 document units, 5×20 document units, or any other regular arrangements. If the number of patent documents cannot be arranged as m×n, for example, 97, the arrangement of 5×20 format will leave three vacancies. However, this is still within the scope of m×n format. The corresponding important information may be located near the related information, for example, on top of, beneath, to the right of or to the left of the related information. Alternatively, a part of the corresponding important information can be displayed in a popup window when the cursor hovers over the related information. For example, in FIG. 3B, the corresponding important information displays the title, issue number and issue date. When the cursor hovers over the related information, the popup window displays the title, abstract, date (of priority, filing, publication, or issue), patent family/families, author (inventor), assignee or any combination of the above.

It is also worth noting that the zoom in/zoom out operation may be performed on the document unit. There may be three ways to implement the zoom in/zoom out operation of document unit. The first approach is when the cursor hovers over the document unit, a larger image of the document unit may be displayed. The second approach is that the system will determine the display ratio of the images of the document units according to the values of m and/or n. The third approach is to use a zoom module to adjust the display size of the images of the document units (see FIG. 5 for details).

Figure 4A:
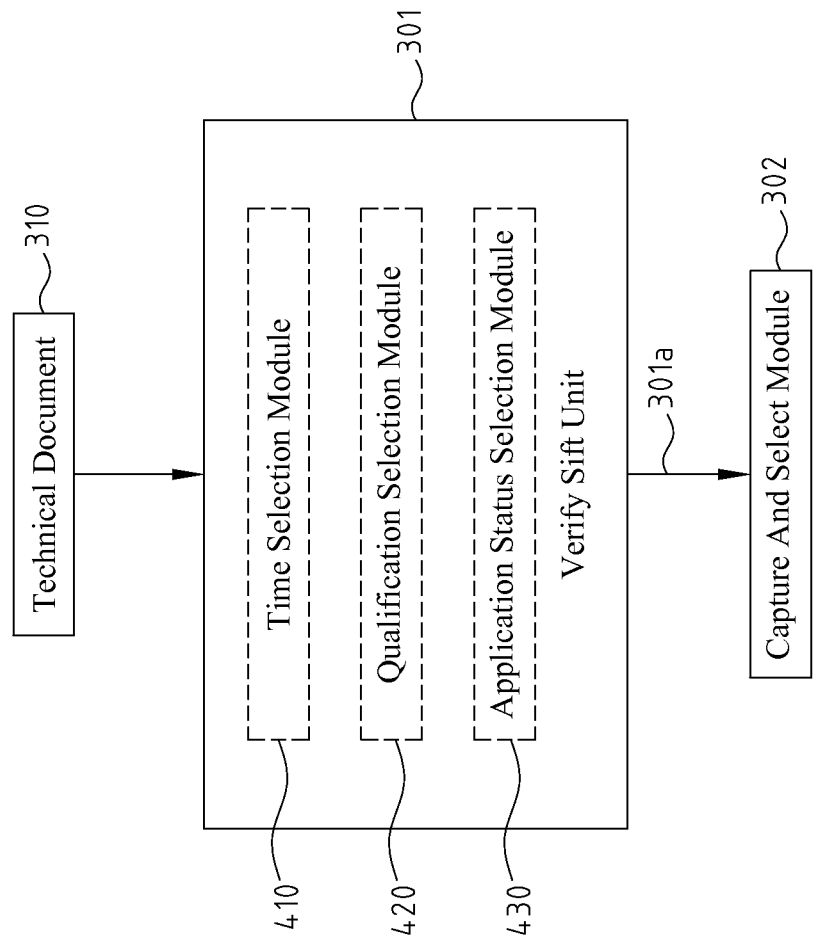
FIG. 4A is an exemplary diagram, illustrating selecting modules included in a verify sift unit, consistent with certain disclosed embodiments of the present invention.

If technical document 310 is a patent document, capturing system 300 may use time in the patent, application status, qualification or contents in the patent as the judge basis to perform capturing and analysis of the patent information. In this manner, verify sift unit 301 may be a type of deterministic logic for using the qualification, application status, time, and contents of the patent document as the judge basis to perform the configuration of capturing parameters of the patent document. Then, verify sift unit 301, as shown in FIG. 4A, may further include a time selection module 410, a qualification selection module 420, an application status selection module 430 or any combination of the above modules. FIG. 4A is an exemplary diagram illustrating selecting modules included in verify sift unit 301, consistent with certain disclosed embodiments of the present invention.

Figure 4B:
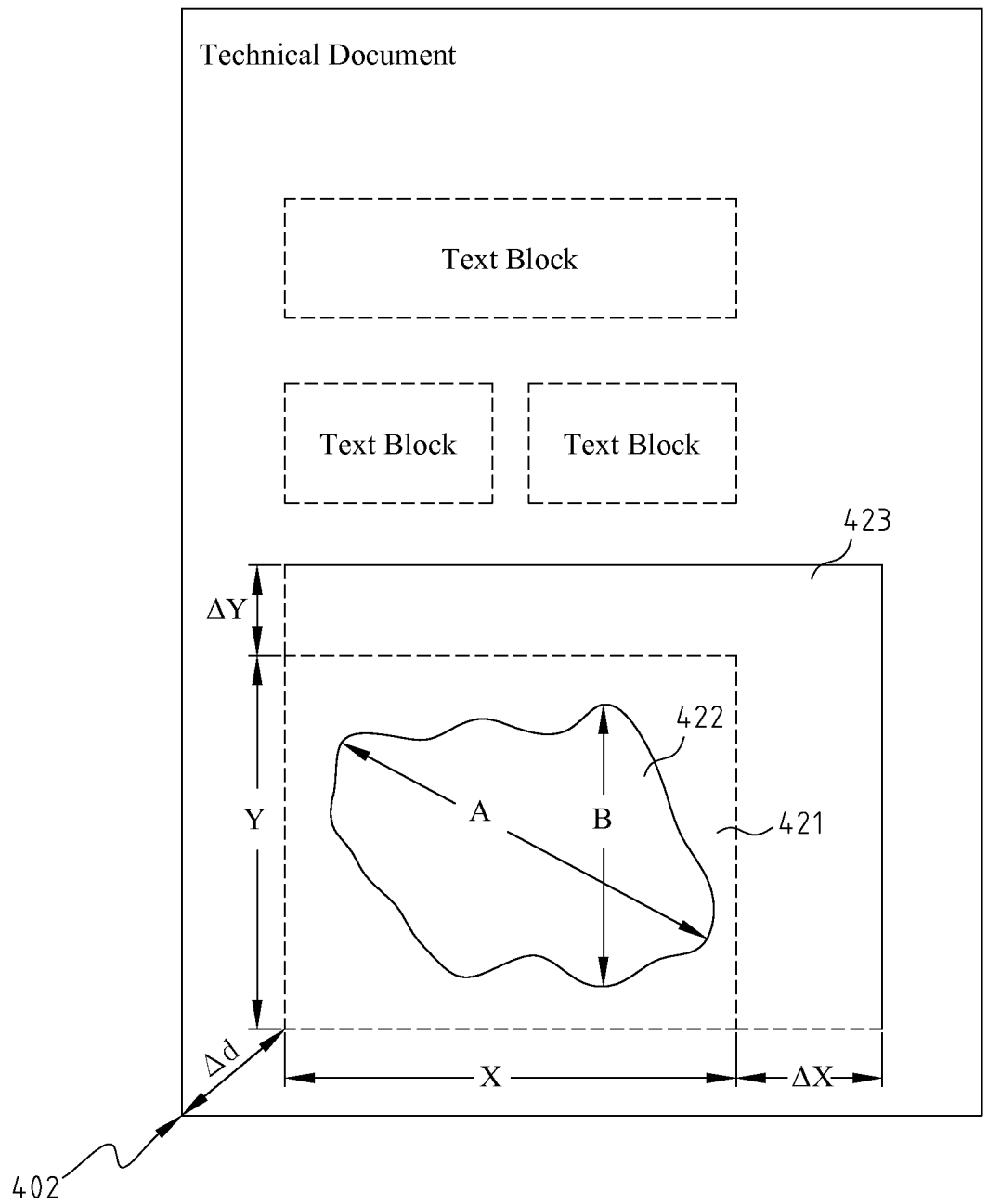
FIG. 4B is an exemplary diagram, illustrating capturing parameters by taking a technical document as an example, consistent with certain disclosed embodiments of the present invention.

When technical document 310 is a patent document, for example, time selection module 410 of verify sift unit 301 in FIG. 4A may use the related time information, such as application date, publication date, issue date, or priority date of the patent document, as the judge basis to perform the configuration of the capturing parameters of technical documents according to different times. For example, the configured capturing parameters may be the starting capturing point, capturing range and related offset of technical document 310. FIG. 4B is an exemplary diagram, illustrating capturing parameters by taking a technical document as an example, consistent with certain disclosed embodiments of the present invention.

Referring to FIG. 4B, starting capturing point and capturing range may be default value, such as the intersection of two boundaries of the original image of the technical document, marked as 402, or the geometric center of the document as the starting capturing point or axis origin (0,0). The capturing range may be defaulted to be a rectangle 421 with length of X and width of Y, or any geometrical area 421 formed with A as a long axis and B as the short axis.

Referring to FIG. 4B, the technical document, for example, is a patent document. If the application date of the patent document is used as the judge basis, the intersection of two boundaries of the original image of the technical document as the origin, and the default capturing range is a 330×400 (pixels) rectangle. When the application date is year 2006, for example, the starting capturing point may be set as related offset $\Delta d$ (+10 mil) from coordinate origin 402, and the capturing range, for example, may be $\Delta X$=10 pixels along the X-axis and $\Delta Y$=20 pixels along the Y-axis. In other words, the capturing range is adjusted by the rectangle 423 with length X+$\Delta X$ and width Y+$\Delta Y$. If only a certain application date is used as a judge basis, the starting capturing point, for example, is the +5 mil from the intersection of the two boundaries of the original image of the patent document, and the capturing range is the rectangle of 310×420, where $\Delta X$ and $\Delta Y$ may be either positive or negative, and 1 mil is $1/1000$ inch.

Similarly, qualification selection module 420 may be a qualification verification module for patent documents. In other words, qualification selection module 420 may use the information in the patent document related to the personnel, country, classification or qualification, such as inventor, assignee, agent, IPC, USC, ELCA, FI/F-term, examiners, etc, as the judge basis to configure the capturing parameters of the patent documents, such as aforementioned starting capturing point, capturing range and related offset. For the example of using the assignee as the judge basis, if the assignee is Industrial Technology Research Institute (ITRI) of Taiwan, the related offset $\Delta d$ of the configured capturing range may be coordinate origin+20 mil, $\Delta X$ of capturing range may be +50 pixels and $\Delta Y$ of capturing range may be +60 pixels, where $\Delta X$ and $\Delta Y$ may be either positive or negative.

Similarly, the application status selection module 430 may use the application status (such as, publication, notice of allowance, divisional or continuation) or refer to information disclosure statement (IDS), number of families, word count of abstract, or application country as the judge basis to configure the capturing parameters of the patent document.

After the capturing parameters are configured by date selection module 410, qualification selection module, application state module 430 or any combination of the above modules, a weighing or Boolean operation, such as AND or OR, may be performed on the capturing parameters of each selection module to finalize the configuration of the capturing parameters. Use the aforementioned application date of year 2006 and ITRI of Taiwan as assignee as an example. The sum of the capturing related offset is equal to the capturing related offset of application date (i.e. 2006) multiplied by weight W1 (of application date) and the capturing related offset of assignee (i.e. ITRI) multiplied by weight W2 (of assignee), where W1+W2=100%. When W1=W2=50%, the sum of the related offset $\Delta d$ is 15 mil.

Similarly, weight W3 for the capturing range of application date=2006 and weight W4 for the capturing range of assignee=ITRI of Taiwan may be obtained. When W3=40% and W4=60%, the sum of $\Delta X$ of the capturing range is 34 and the sum of $\Delta Y$ of the capturing range is 28. Therefore, for patent documents applied by ITRI of Taiwan in 2006, the starting capturing point is +15 mil from the intersection of two boundaries of the original image of the patent document and the capturing range is the rectangle of 334×328 pixels. The starting capturing point and the capturing range of the patent document may be obtained accordingly.

Figure 5:
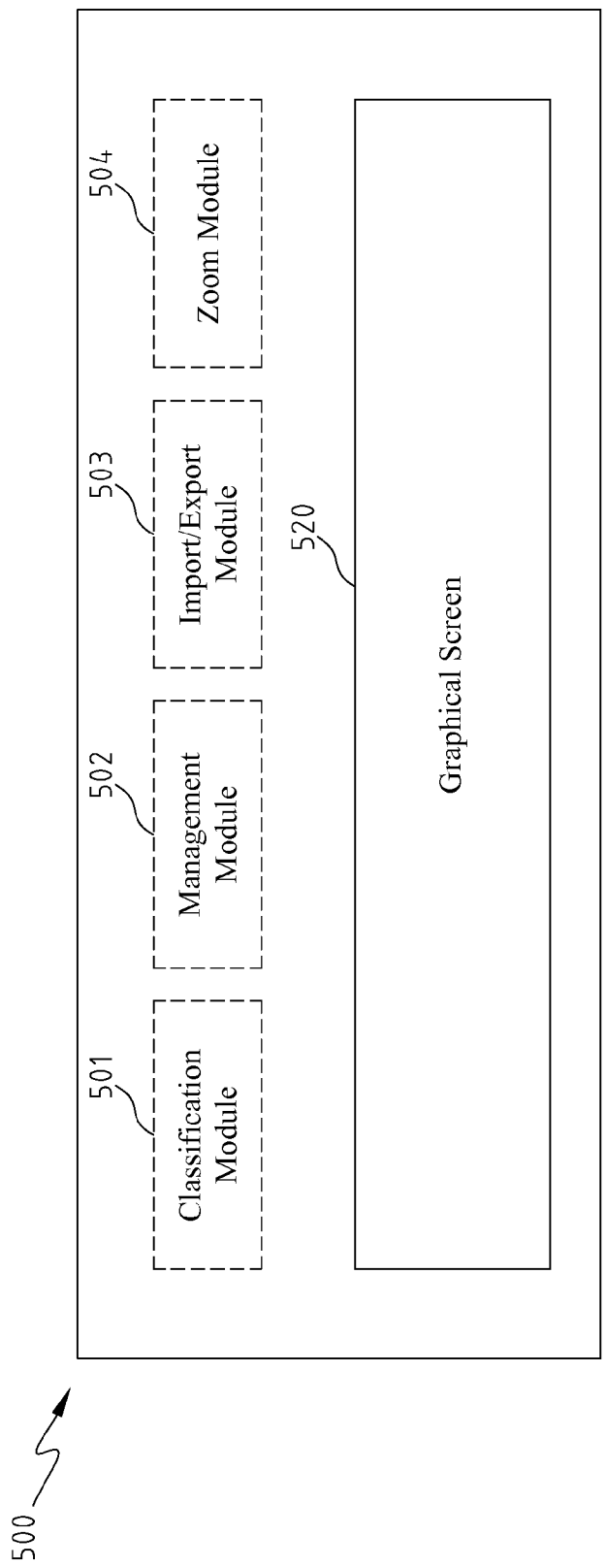
FIG. 5 is an exemplary reading system for technical documents, consistent with certain disclosed embodiments of the present invention.

According to the present invention, the reader may then perform classification, filing, deleting, importing/exporting by reading the graphical screen or through hyperlink module 350. FIG. 5 is an exemplary reading system for technical documents, consistent with certain disclosed embodiments of the present invention.

Referring to the exemplary embodiment of FIG. 5, technical document reading system 500 may comprise a graphical screen 520 with m×n document units, and m and n are positive integers. In general, both m and n are greater than 1. It may further include a classification module 501, a management module 502, an import/export module 503, a zoom module 504, or any combination of the above modules. Graphical screen 520 may be captured by capturing system 300. Through graphical screen 520, the reader may use classification module 501 to classify a group of graphical technical documents into different technical classes or product classes and stores in a system. Through management module 502, the readers may file, after finishing the judgment of the technical data, into the system according to features of the technical data or delete the selected technical data from the system. Import/export module 503 is for importing and exporting the selected technical data from or to the system. Zoom module 504 is for zooming in/zoom out the document units so that different sizes of images of document units can be displayed. In reading system 500, there are many ways to realize each module.

Figure 6:
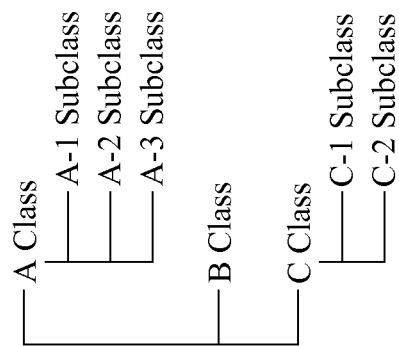
FIG. 6 is an exemplary diagram, illustrating classification of technical data through a classification module, consistent with certain disclosed embodiments of the present invention.

In reading system 500, the reader may accomplish the classification of technical data based on the sub-class to which the feature of the technical data belongs. FIG. 6 is an exemplary diagram, illustrating classification of technical data through classification module 501, consistent with certain disclosed embodiments of the present invention. In the example of FIG. 6, the technical data is classified into A, B and C classes, and may further refine the classification if necessary. For example, A class is further divided into A-1, A-2 and A-3 subclasses, and C class is divided into C-1 and C-2 subclasses.

Figure 7:
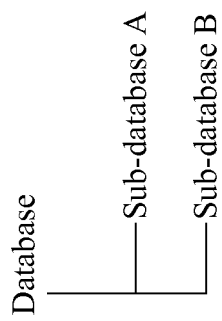
FIG. 7 is an exemplary diagram, illustrating filing the technical data into two databases in a system, consistent with certain disclosed embodiments of the present invention.

After the reader finishes the judgment of the technical data, the reader may use management module 502 to file the technical data to the sub-database of the system according to the feature of the technical data. FIG. 7 shows the technical data being filed into two sub-databases A and B, consistent with certain disclosed embodiments of the present invention.

According to the present invention, the reader may log the comments to the technical documents or read comments of other readers. Accordingly, another exemplary embodiment of the present invention provides a commentating system for technical documents. The commentating system is an information sharing platform for review reports. The commentating system may provide the reader with the capability to log the comments on the technical documents after reading, show comments from other readers and attach or generate data collected or generated in reading and analyzing the technical document, such as the file wrapper of the patent document, news event, trading information, lawsuit information and so on.

Figure 8:
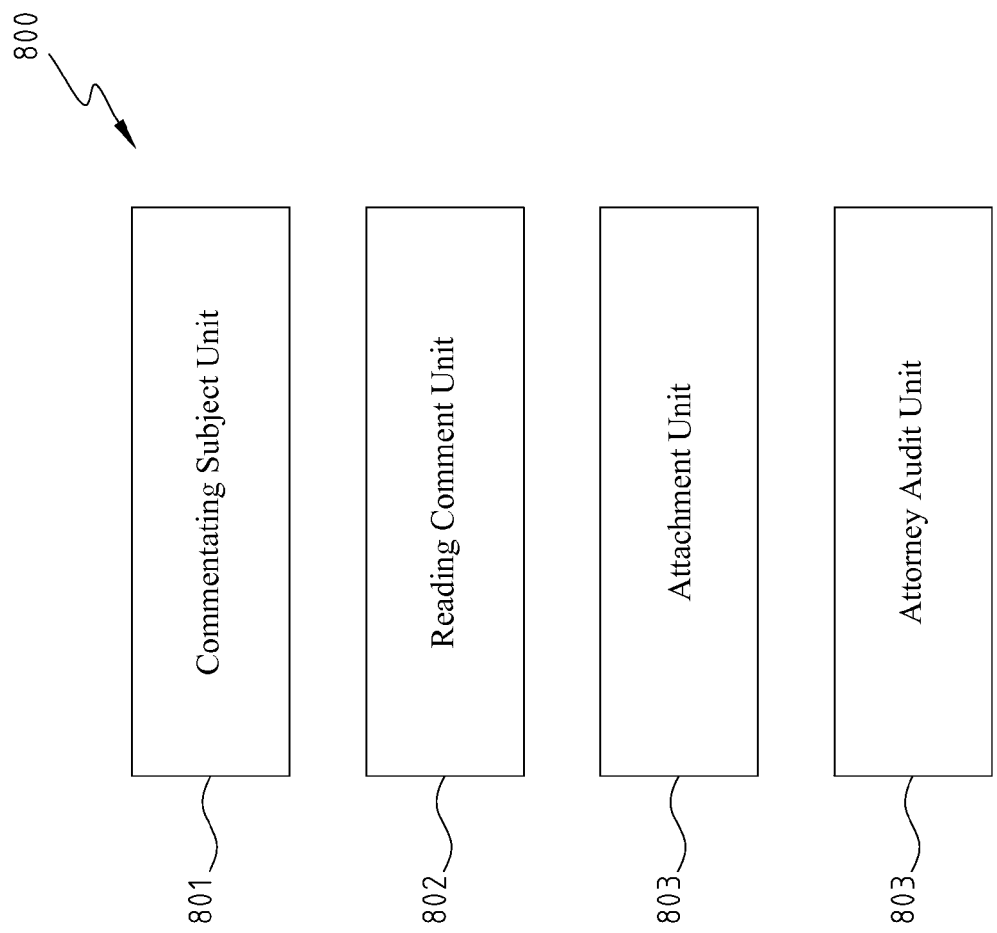
FIG. 8 is an exemplary commentating system for technical documents, consistent with certain disclosed embodiments of the present invention.

FIG. 8 shows an exemplary commentating system for technical documents, consistent with certain disclosed embodiments of the present invention. The commentating system 800 at least comprises a commentating subject unit 801, a reading comment unit 802, an attachment unit 803 and/or an attorney audit unit 804. Commentating subject unit 801 may allow the reader to input the comment subject as well as display different commentating subjects in the system. Reading comment unit 802 may allow the reader to log the comments after reading as well as display comments from other readers. Attachment unit 803 may allow the reader to attach the data collected or generated by the reader during reading and analysis. Attorney audit unit 804 provides an interface for the attorney to perform the tasks of commentating with commentating subject unit 801 and reading comment unit 802 so that the analysis table or data can be used in seeking legal opinion or taking legal action. The interface is configured to allow authorized or attorney to login with specific account to check on the data or the comments and to perform confirmation, communication or interaction so that the related comments are protected under the attorney-client privilege.

Figure 9:
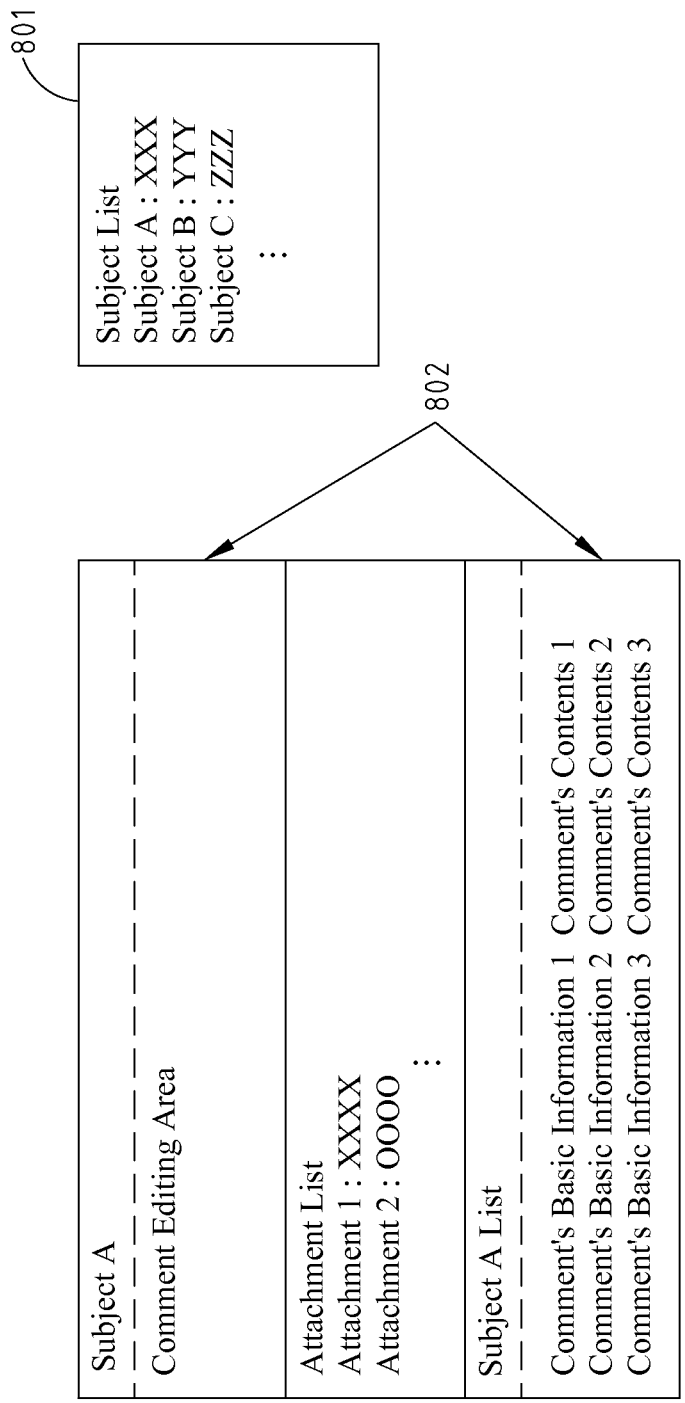
FIG. 9 is an exemplary implementation for each unit in the commentating system for technical documents, consistent with certain disclosed embodiments of the present invention.

The units of the commentating system may be realized in many ways. For example, in the exemplary embodiment of FIG. 9, commentating system 800 may generate date, reader's name or identity for a subject A automatically on reading comment unit 802. The reader may log the comments in the comment editing area after reading the technical document, such as summary, critics, and reviews of the technical document. Comments from other readers may also be displayed on reading comment unit 802. For example, for subject A, three comments from other readers are listed. Each comment may include the basic information and the contents of the comment, and may be displayed in the manner of a blog. The reader may input the subject to comment subject unit 801 as well as list different subjects, such as A, B, C, etc. In reading and analysis, the reader may collect or generate other data, and these data may be generated as an attachment file or through hyperlink, and attached in attachment unit 803. For example, in the attachment list, attachment 1 is a file wrapper of the patent document and attachment 2 is the news event or the trading information, etc.

Figure 10:
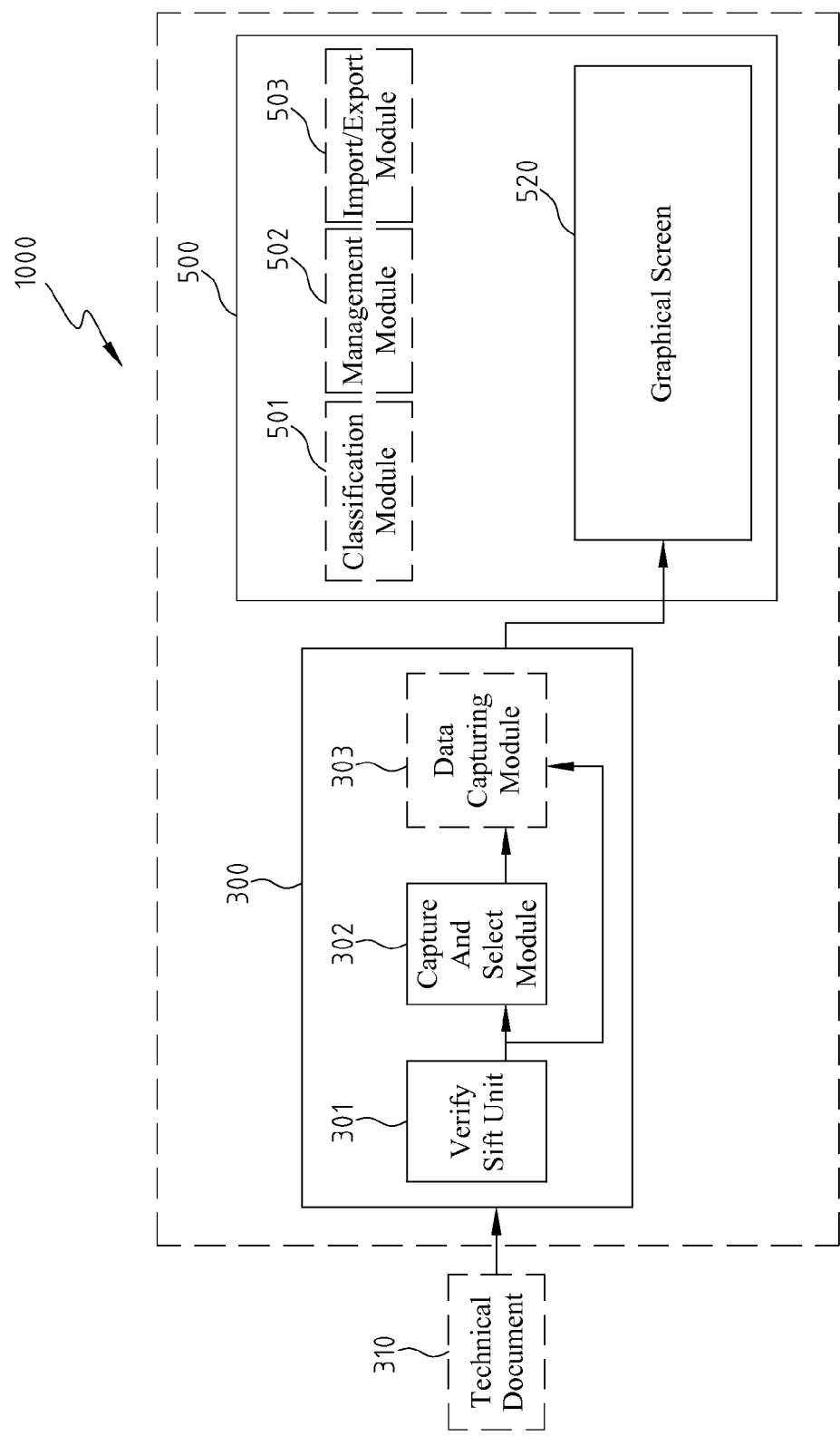
FIG. 10 is an exemplary capturing and reading system for technical documents, consistent with certain disclosed embodiments of the present invention.
Figure 11:
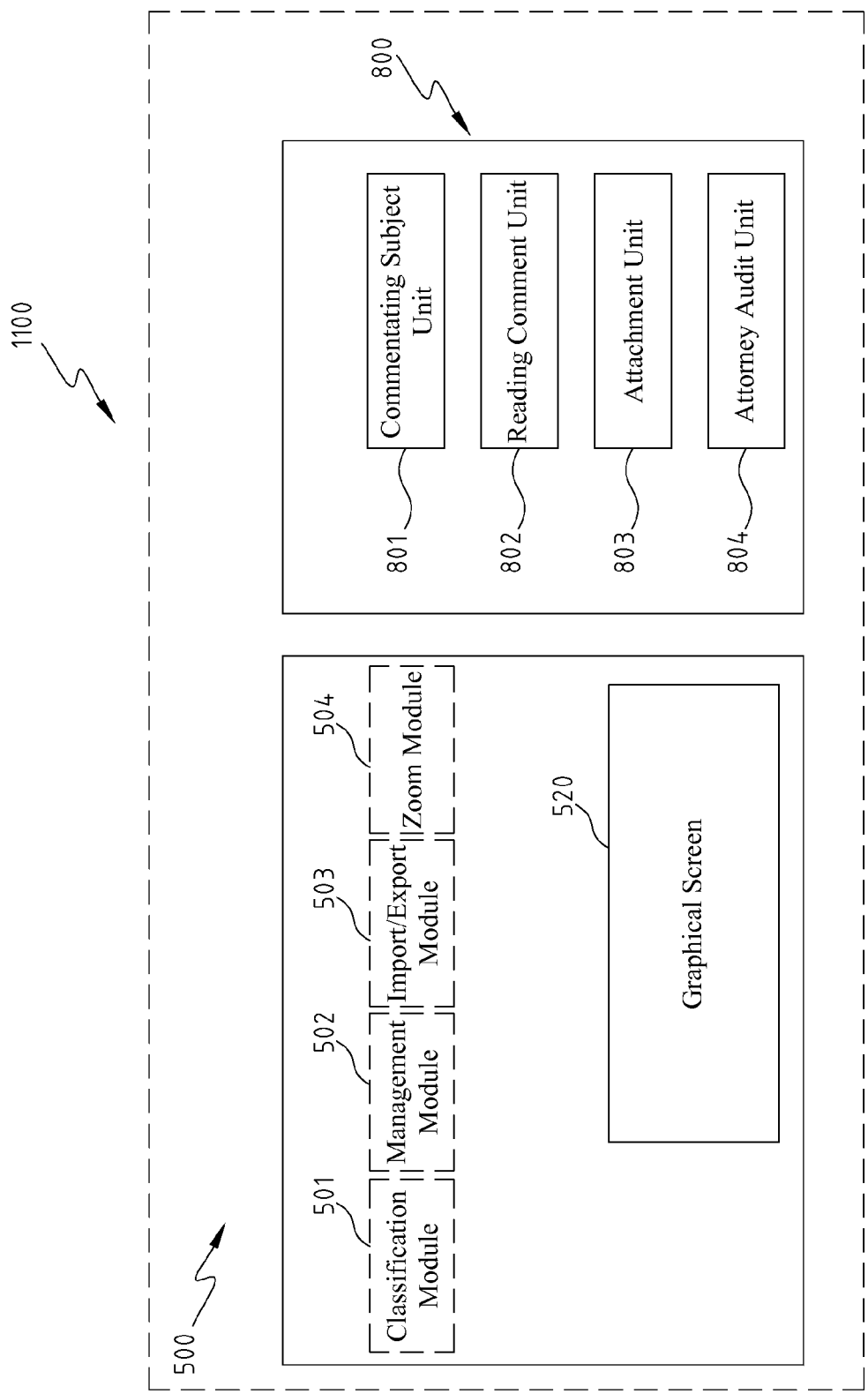
FIG. 11 is an exemplary reading and commentating system for technical documents, consistent with certain disclosed embodiments of the present invention.
Figure 12:
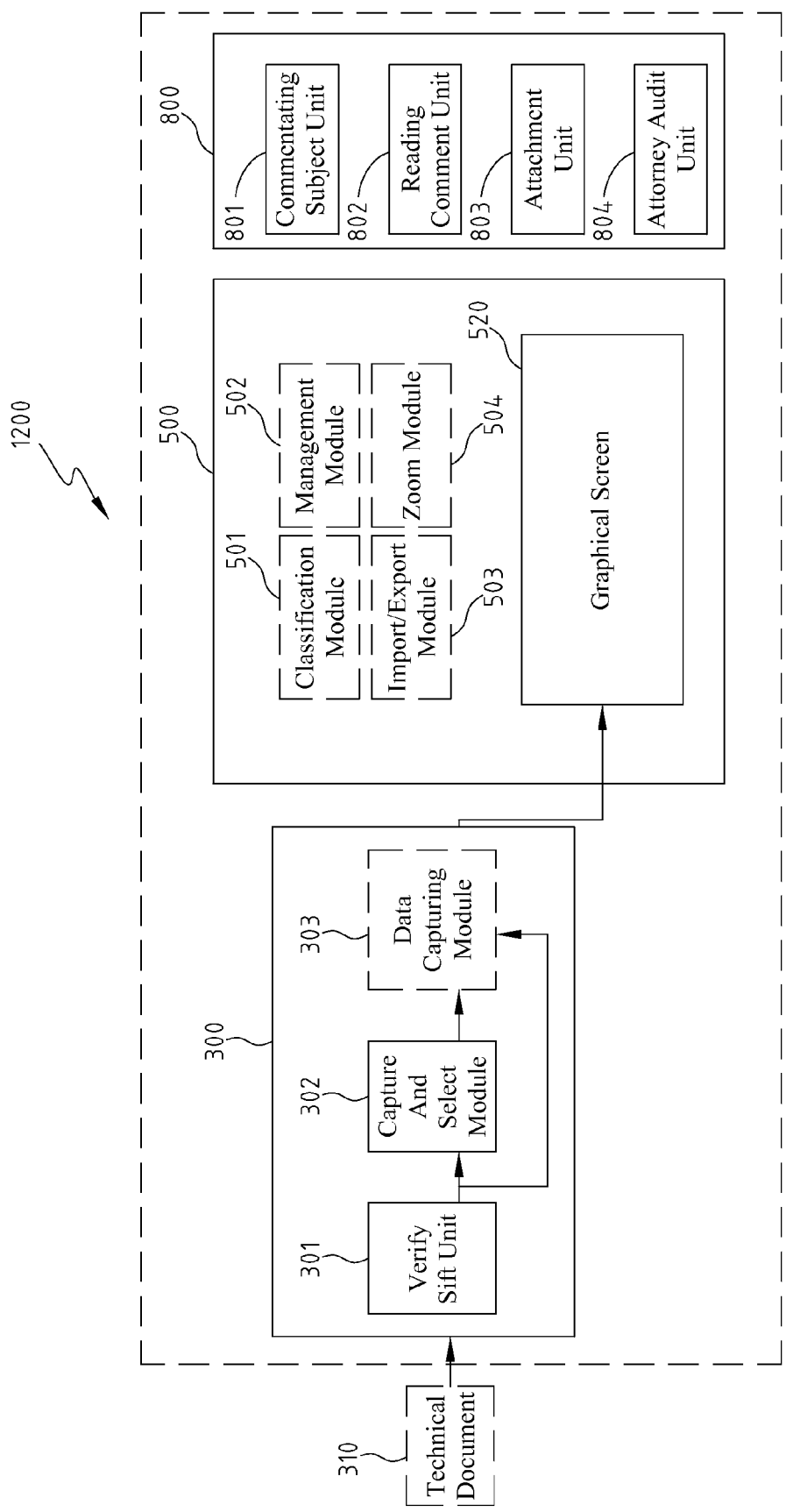
FIG. 12 is an exemplary capturing, reading and commentating system for technical documents, consistent with certain disclosed embodiments of the present invention.

According to the present invention, technical document capturing system 300 and reading system 500 may be integrated into a capturing and reading system 1000 for technical documents, as shown in FIG. 10. Similarly, reading system 500 and commentating system 800 for technical documents may also be integrated into a reading and commentating system 1100 for technical documents, as shown in FIG. 11. In some specific embodiment, reading and commentating system 1100 may include two commentating systems 800, where one commentating system 800 is for all the system users to share all the information, and the other commentating system 800 is for authority control to allow only specific users to share specific information. Capturing system 300, reading system 500 and commentating system 800 for technical documents may all be integrated into a capturing, reading and commentating system for technical document 1200, as shown in FIG. 12. Each system may be integrated according to the actual application.

Figure 13:
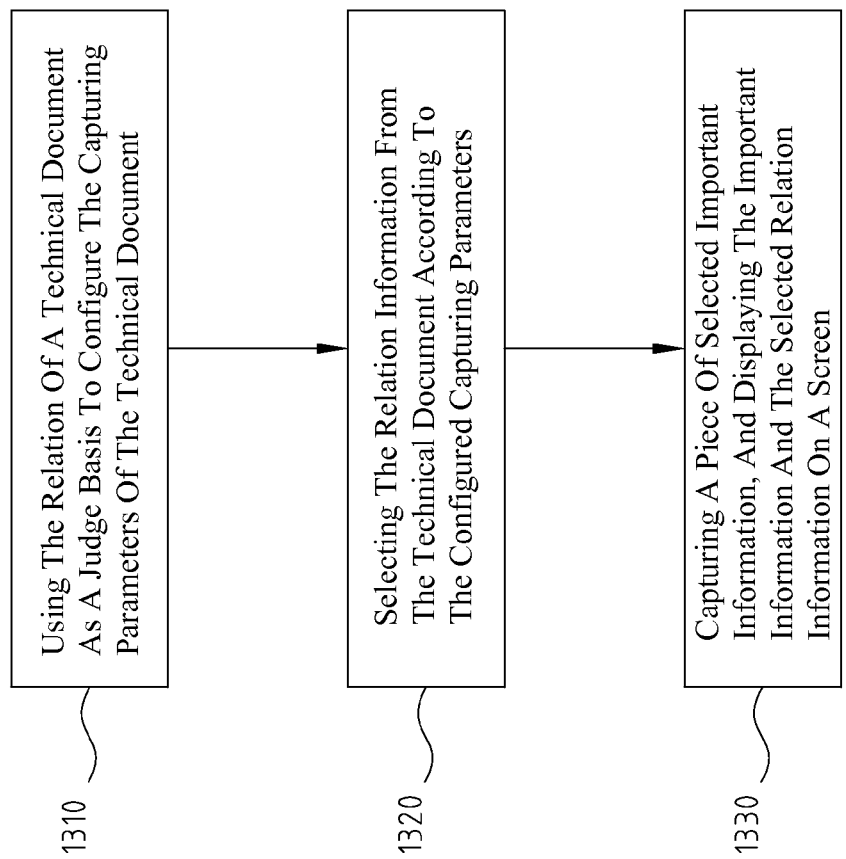
FIG. 13 is an exemplary flowchart illustrating a capturing method for technical documents, consistent with certain disclosed embodiments of the present invention.

Following FIG. 3A and the above description, the present invention may also disclose a capturing method for technical document, as shown in the exemplary flowchart of FIG. 13. Referring to FIG. 13, the relation of a technical document is used as a judge basis to configure the capturing parameters of the technical document, as shown in step 1310. The relation information is selected from the technical document according to the configured capturing parameters, as shown in step 1320. A piece of selected important information is captured, and the important information and the selected relation information are displayed on a screen, as shown in step 1330.

As mentioned above, the configured capturing parameters at least include the starting capturing point, capturing range and related offset of the technical document. The screen may also provide hyperlink to link the system database for obtaining advanced related information or full document/text of the technical document (or patent).

Figure 14:
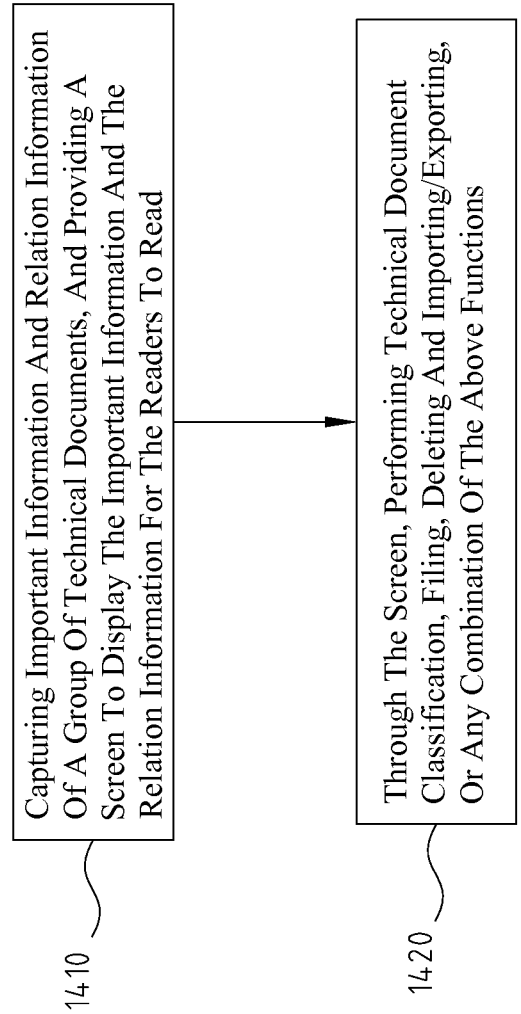
FIG. 14 is an exemplary flowchart illustrating a reading method for technical documents, consistent with certain disclosed embodiments of the present invention.

Following FIG. 5 and the above description, the present invention may also disclose a technical document reading method, as shown in FIG. 14. In step 1410, important information and relation information of a group of technical documents are captured, and a screen is provided to display the important information and the relation information for the readers to read. Through the screen, the reader may perform technical document classification, filing, deleting and importing/exporting or any combination of the above functions, as shown in step 1420.

Following step 1420, the present invention may further include a step of providing an information sharing platform. The information sharing platform allows the readers to log the comments after reading technical documents as well as to attach the data generated or collected during the reading and analysis process, or to display comments from other readers, as shown in step 1510 of FIG. 15. Accordingly, the present invention also provides a reading and commentating method for technical documents.

Therefore, the present invention provides a system platform for technical documents to form a technical document network so as to effectively accumulate and share the team knowledge, and accomplish search and analysis for technical documents in a fast and effective manner. In addition, because the present invention translates patent documents into different states, the present invention can greatly reduce the system load caused by repetitive or many users trying to open graphic format files simultaneously.

The exemplary disclosed embodiments of the present invention may be implemented with a computer program product with program code means for carrying out the method for generating patent document. The program codes may be executable in a computer system. The program codes may be stored in a storage device, such a memory device, and the computer system may access the program codes through the storage device.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A capturing system for technical documents, said capturing system comprising:

a verify sift unit for configuring a plurality of capturing parameters of a technical document according to relation information of said technical document, said relation information including information related to time, personnel, country, classification or qualification of said technical document; and a capture and select module for selecting the relation information from said technical document according to said plurality of capturing parameters;

wherein said capturing parameters are selected from any combination of parameters in a group including a starting capturing point, a capturing range and a related offset of said technical document.

2. The system as claimed in claim 1, wherein said verify sift unit includes a time selection module, a qualification selection module and an application status selection module, or any combination of the above modules, and each of the selection modules of the verify sift unit performs the configuration of capturing parameters of said technical document, respectively.

3. The system as claimed in claim 2, wherein said time selection module performs the configuration of the capturing parameters of said technical document according to different times.

4. The system as claimed in claim 2, wherein said qualification selection module performs the configuration of the capturing parameters of said technical document according to information related to personnel, country, classification, or qualification of said technical document.

5. The system as claimed in claim 2, wherein said application status selection module performs the configuration of the capturing parameters of said technical document according to application status, information disclosure statement, number of families, or any combination of parameters in said technical document.

6. The system as claimed in claim 2, said capturing system applies a weighing or Boolean operation on said plurality of capturing parameters configured by each of the selection modules of the verify sift unit to finalize the configuration of said plurality of capturing parameters.

7. The system as claimed in claim 1, wherein the relation information comprises at least a related drawing of said technical document, and the related drawing is a main figure of said technical document.

8. The system as claimed in claim 1, wherein said capturing system further includes a data capturing module, and said data capturing module selects important information of said technical document then displays the important information together with the relation information selected by said capture and select module onto a screen.

9. The system as claimed in claim 8, wherein said screen is a regularly arranged graphical screen divided into a plurality of document units arranged in a matrix form with a plurality of columns and a plurality of rows, each of said document units being a screen area for displaying document information of a specific technical document, and said document information including the important information, or related drawings including a single drawing or a plurality of drawings, or a combination of the important information and the related drawings.

10. The system as claimed in claim 9, wherein a total number of columns in said plurality of columns ranges from 3 to 7.

11. The system as claimed in claim 9, wherein a total number of rows in said plurality of rows ranges from 3 to 1000.

12. The system as claimed in claim 9, wherein a total number of rows in said plurality of rows ranges from 8 to 30.

13. The system as claimed in claim 9, wherein some of said plurality of document units are vacant and not used for displaying document information.

14. The system as claimed in claim 9, further including a zoom module for zooming images displayed in said screen, and when a cursor hovers over the screen area of a specific document unit, a popup window displays the corresponding important information of the technical document whose document information is currently displayed in the specific document unit.

15. The system as claimed in claim 1, wherein said technical documents are patent documents, said verify sift unit further uses a main drawing of a patent document for configuring said plurality of capturing parameters and said capture and select module selects said main drawing from said patent document according to said plurality of capturing parameters.

16. A method of a capturing system for technical documents, said method comprising the steps of:

using a verify sift unit for configuring a plurality of capturing parameters of a technical document according to relation information of said technical document, said relation information including information related to time, personnel, country, classification or qualification of said technical document; and using a capture and select module for selecting the relation information from said technical document according to said plurality of capturing parameters;

wherein said capturing parameters are selected from any combination of parameters in a group including a starting capturing point, a capturing range and a related offset of said technical document.

17. The method as claimed in claim 16, wherein the method further comprises a step of using a data capturing module to select important information of said technical document then display the important information together with the relation information selected by said capture and select module onto a screen.

18. The method as claimed in claim 17, wherein said screen is a regularly arranged graphical screen divided into a plurality of document units arranged in a matrix form with a plurality of columns and a plurality of rows, each of said document units being a screen area for displaying document information of a specific technical document, and said document information including the important information, or related drawings including a single drawing or a plurality of drawings, or a combination of the important information and the related drawings.

19. The method as claimed in claim 18, wherein a total number of columns in said plurality of columns ranges from 3 to 7.

20. The method as claimed in claim 18, wherein a total number of rows in said plurality of rows ranges from 3 to 1000.

21. The method as claimed in claim 18, wherein a total number of rows in said plurality of rows ranges from 8 to 30.

22. The method as claimed in claim 18, wherein some of said plurality of document units are vacant and not used for displaying document information.

* * * * *